(12) United States Patent
Siemer et al.

(10) Patent No.: US 7,052,004 B2
(45) Date of Patent: May 30, 2006

(54) HYDRAULICALLY DAMPING RUBBER BEARING

(75) Inventors: Hubert Siemer, Dinklage (DE); Claudia Willert, Steinfeld (DE); Frank Duisen, Damme (DE); Andreas Vossel, Osnabrück (DE)

(73) Assignee: ZF Lemförder Metallwaren, Stemwede-Dielingen (DE)

( * ) Notice: Subject to any disclaimer, the term of this patent is extended or adjusted under 35 U.S.C. 154(b) by 184 days.

(21) Appl. No.: 10/250,386

(22) PCT Filed: Oct. 29, 2002

(86) PCT No.: PCT/DE02/04035

§ 371 (c)(1),
(2), (4) Date: Jun. 25, 2003

(87) PCT Pub. No.: WO03/038301

PCT Pub. Date: May 8, 2003

(65) Prior Publication Data

US 2004/0041317 A1  Mar. 4, 2004

(30) Foreign Application Priority Data

Oct. 31, 2001 (DE) .............................. 101 53 220

(51) Int. Cl.
*F16F 13/00* (2006.01)
*F16F 7/00* (2006.01)

(52) U.S. Cl. ............. 267/141; 267/140.11; 267/140.13

(58) Field of Classification Search ................ 267/219, 267/140.11, 140.12, 140.13, 140.2, 141
See application file for complete search history.

(56) References Cited

U.S. PATENT DOCUMENTS

| 4,422,779 | A | * | 12/1983 | Hamaekers et al. ........... 384/99 |
| 4,699,099 | A | * | 10/1987 | Arai et al. ................ 123/192.1 |
| 4,754,956 | A | * | 7/1988 | Barone et al. .......... 267/140.14 |
| 4,834,349 | A |   | 5/1989 | Arai et al. |
| 4,896,867 | A | * | 1/1990 | Schyboll et al. ........ 267/140.13 |
| 4,909,490 | A | * | 3/1990 | de Fontenay ........... 267/140.13 |
| 4,969,632 | A | * | 11/1990 | Hodgson et al. ........ 267/140.11 |
| 5,094,433 | A | * | 3/1992 | Dan et al. ............... 267/140.13 |
| 5,123,635 | A |   | 6/1992 | Bouhours |
| 5,375,822 | A |   | 12/1994 | Hirasawa et al. |
| 5,397,112 | A | * | 3/1995 | Roth et al. .............. 267/140.12 |
| 5,411,243 | A |   | 5/1995 | Gennesseaux |
| 5,657,510 | A | * | 8/1997 | Satori et al. ................... 16/2.2 |
| 6,375,172 | B1 | * | 4/2002 | Bungart et al. ......... 267/140.13 |
| 6,666,437 | B1 | * | 12/2003 | Larmande et al. ........ 267/141.2 |

FOREIGN PATENT DOCUMENTS

DE       36 19 685       12/1987

(Continued)

*Primary Examiner*—Matthew C. Graham
(74) *Attorney, Agent, or Firm*—McGlew and Tuttle, P.C.

(57) ABSTRACT

A hydraulically damping rubber mount is provided with a variable channel length. The mount channel length can be adapted to the later intended use with a simple design during the manufacture without changing the design. The hydraulic mount has an elastomeric damping member, at least two chambers to accommodate a fluid damping agent and a channel carrier with a channel connecting the chambers in a flow-conducting manner. The channel has passage openings to the chambers. An incompletely closed ring, one end of which forms a channel deflection, is displaceably guided in the channel in the manner according to the present invention. The channel is divided as a result into two channel parts, which unite between the ends of the ring and through which the damping agent flows in opposite directions.

26 Claims, 6 Drawing Sheets

FOREIGN PATENT DOCUMENTS

| | | |
|---|---|---|
| DE | 37 19 677 | 12/1987 |
| DE | 40 41 779 | 6/1992 |
| DE | 691 04 549 | 5/1995 |
| DE | 199 19 876 | 6/2000 |
| JP | 61-248934 | 11/1986 |
| JP | 5-106681 | 4/1993 |

* cited by examiner

HYDRAULICALLY DAMPING RUBBER BEARING

FIELD OF THE INVENTION

The present invention pertains to a hydraulically damping rubber mount with variable channel length, which has an elastomeric spring element or damping member, at least two chambers for accommodating a fluid damping agent and a channel carrier with a channel for the circulation of the damping agent, which channel is formed therein and connects the chambers in a flow-conducting manner.

BACKGROUND OF THE INVENTION

Rubber mounts are used especially in the manufacture of automobiles, e.g., for mounting transversal swinging arms, stabilizers or the vehicle engine, in many and different ways and in a great variety of designs with respect to the particular specific intended use. Distinction is made here essentially between bush mounts for damping forces introduced radially and engine mounts, which are designed mainly to absorb forces introduced axially. The damping characteristic of the mounts is to be set corresponding to the particular intended use. Besides design measures concerning the shaping and the material composition of the elastomeric damping member, it is known that the damping characteristic can be additionally affected and supported by a fluid damping agent accommodated by the mount body. Chambers and at least one channel, which connects the chambers and thus makes possible the circulation of the damping agent, are provided in the mount body of such a hydraulically damping mount (hydraulic mount). The damping characteristic of the mount is affected essentially by the volume of the channel, i.e., its length and cross section, besides by the properties of the elastomeric damping body. However, it is still necessary according to the state of the art, in general, to build a new mount for each geometric variation of the channel. The finished component can reflect only one setting concerning the location and the maximum of the damping. However, because of the many different uses of the mounts and the different requirements of the automobile manufacturers, it is desirable for the mount manufacturers from the viewpoint of economy in the manufacture to design hydraulic mounts such that their damping characteristic can be set in a simple manner corresponding to the particular requirements by varying the channel geometry during the manufacture.

Moreover, it is advantageous for testing purposes or also in connection with tuning procedures if the damping characteristic can be varied even on the finished component, i.e., during the use of the mount, namely, during or after its installation in the vehicle or a machine.

Hydraulic mounts have therefore already become known in which the channel geometry can be varied by means of movable elements actuated by actuators. A special difficulty lies in the circumstance that the moving elements are located in the areas of the mount that are filled with liquid, whereas the actuators are arranged in areas of the mount that are not filled with liquid. This requires increased effort for sealing the liquid-filled areas.

DE 40 41 779 A1 discloses, e.g., an engine mount in which the channel walls can be adjusted by means of a bevel gear, which is arranged in the mount body, is actuated by an external drive and transmits its movement in turn to a toothed ring, to change the channel cross section and/or the channel length. To ensure this functionality, the mount described in the document has a comparatively complicated design.

SUMMARY OF THE INVENTION

The object of the present invention is to design a hydraulically damping rubber mount such that its channel length can be adapted to the later intended use during the manufacture without changing the design, while it has a simple design. Moreover, the mount shall offer in a simple manner the additional possibility of also permitting the variation of the channel length on the finished, possibly already installed component.

Accordingly, in a first solution, the hydraulically damping rubber mount according to the present invention with variable channel length comprises an elastomeric spring element or damping member, at least two chambers for accommodating a fluid damping agent as well as a channel carrier with a channel for circulating the damping agent, which said channel is formed in the channel carrier and connects the chambers in a flow-conducting manner. According to the solution proposed, the channel has passage openings to the chambers. A sliding ring, which may be designed as an incompletely closed ring, is guided displaceably in the channel, and its thickness, which is smaller compared with the width of the annular groove, expands at one of its ends to the width of the annular groove, forming a channel deflection, so that the channel is divided by the sliding ring into two channel parts, which unite between its ends and through which damping agent flows in opposite directions.

Another hydraulic mount proposed comprises an elastomeric spring element or damping member, at least two chambers formed in the mount body for accommodating a fluid damping agent and a channel carrier that is axially symmetrical to the axis of the mount. A channel, which connects the chambers to one another in a flow-conducting manner for the circulation of the damping agent, is formed in the channel carrier. This channel has passage openings to the chambers. It is formed by an annular groove extending peripherally in the channel carrier or its outer circumference. A ring (sliding ring), which is not completely closed, is guided displaceably in this annular groove. The sliding ring has a smaller thickness compared with the width of the annular groove over nearly its entire circumference. However, its expands at one of its ends to the width of the annular groove, forming a channel deflection. As a consequence, the channel is divided by the sliding ring into two channel parts, which unite between the ends of the sliding ring and through which the damping agent flows in opposite directions. Consequently, a channel length that can be varied at least in the course of the manufacture, but possibly even after the assembly of the mount (see the explanations below) is embodied according to the present invention with a simple design of the mount at the same time by the combination of the sliding ring guided in the annular groove with the passage openings to the damping agent chambers, which said passage openings are at fixed positions.

Corresponding to another possible embodiment of the mount according to the present invention, the longitudinal extension of the channel parts is limited in the area of the passage openings to the chambers by narrowed parts of the annular groove forming the channel. The sliding ring is guided by these narrowed parts of the annular groove.

According to a possible embodiment, the channel carrier is designed as a hollow cylinder, in the jacket surface of which the annular groove forming the channel is recessed.

The radial outer limitation of the channel is formed in this case by a sleeve surrounding the channel carrier. Another possible embodiment is given by the disk-shaped design of the channel carrier. The channel is designed in this variant as an annular groove recessed in the channel carrier axially in relation to the geometry of the mount. The annular groove is covered by a cover on the axial side.

Both of the above-mentioned embodiments are suitable for embodying a bush mount, which comprises a cylindrical inner part, an elastomeric damping member, which surrounds the inner part and is connected to it by vulcanization, as well as two chambers located opposite each other. This bush mount is surrounded either completely or limited to part of its axial extension by the channel carrier designed as a hollow cylinder or is limited axially on the front side by the disk-shaped channel carrier.

The principle according to the present invention may also be used in its embodiment with a disk-shaped channel carrier to embody an engine mount. The two chambers of the engine mount located axially one after another are separated from each other in space in this case by the disk-shaped channel carriers arranged in the mount body at right angles to the longitudinal axis. Corresponding to a preferred embodiment, the channel carrier has a multipart design and comprises two perforated disks enclosing between them a membrane (rubber disk). The sliding ring, which likewise has a circumferential annular groove in this embodiment, is arranged in the annular groove recessed in one of the perforated disks. The annular groove of the sliding ring faces with its opening the annular groove in the perforated disk. As was stressed above, the above explanations of the design of an engine mount pertain to a preferred embodiment. However, other embodiments are also possible in terms of detail while the principle according to the present invention is maintained. Thus, the buckling spring formed by the membrane or rubber disk may also be vulcanized in an outer ring of the mount and optionally it may not be integrated within the channel carrier.

Corresponding to an especially advantageous variant of the rubber mount according to the present invention, actuators to be actuated from the outside of the mount are arranged at the channel carrier and/or at the sliding ring. The channel carrier and the sliding ring may be rotated in relation to one another even in a completely mounted, optionally installed mount by means of these actuators. As a result, the overall channel length resulting from the sum of the extensions of the two channel parts can also be adjusted variably on an already installed mount.

In one possible embodiment of this variant, the circumference of the channel carrier and/or of the sliding ring has an additional annular groove for the variable setting of the channel length. A cable, by which the channel carrier and the sliding ring can be rotated in relation to one another manually or by means of a drive, runs in this additional annular groove. Deviating from this embodiment, a gear mechanism, a toothed belt or another form of belt drive or even hydraulic or pneumatic adjusting members may be used as actuators as well. At any rate, the coupling of these actuators with the sliding ring and/or the channel carrier is greatly facilitated by the solution proposed by the present invention as a consequence of the displacement of the channel into the radially outer areas of the mount.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
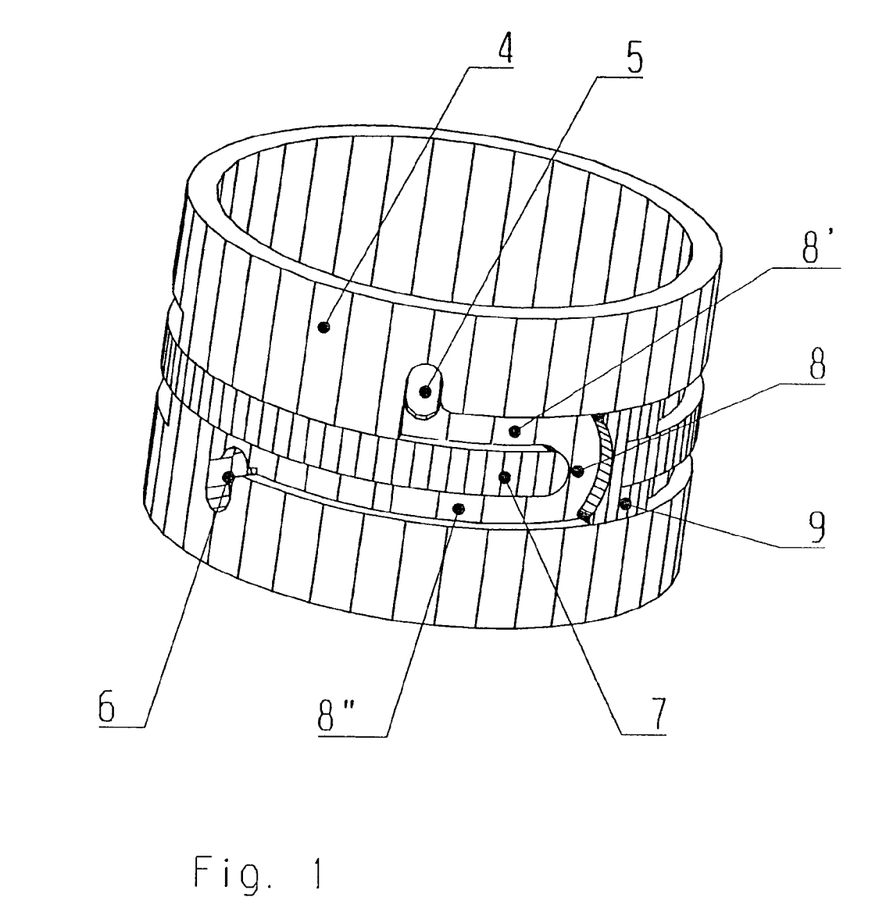
FIG. 1 is perspective view of a first possible embodiment of the channel carrier with a sliding ring incorporated in the channel.

Referring to the drawings in particular, FIG. 1 shows a possible embodiment of the channel carrier 4 of the rubber mount according to the present invention. This is a channel carrier 4 of a bush mount. The channel carrier 4 is designed as a hollow cylinder, which surrounds the components not shown in this figure (inner part 13 with the surrounding elastomeric damping member 1 as well as chambers 2, 3 for the damping agent) of the bush mount along its axial extension completely or over an axial section. As can be recognized, the annular groove, which forms the channel 8, is recessed in the jacket surface of the channel carrier 4. A sliding ring 7 is guided in the annular groove with the stationary passage openings 5, 6 to the chambers 2, 3. This sliding ring 7, which, as is apparent from FIG. 1, is not completely closed, has a smaller thickness d compared with the width b of the annular groove over nearly its entire circumference. However, it expands to the width b of the groove at one of its ends. As a result, it forms a channel deflection 9. Due to this special design of the sliding ring 7, the channel 8 is divided into two channel parts 8', 8", which unite between the ends of the sliding ring 7 in the area of the channel deflection 9. Damping agent, which can flow via the passage openings 5, 6 from one chamber 2, 3 of the mount body not shown in FIG. 1 into the other, now flows through the two channel parts 8', 8" in opposite directions. It is seen immediately that the effective channel length can be changed by displacing the sliding ring 7 in the annular groove. For example, a displacement of the sliding ring 7 by rotating to the right would lead to an increase in the lengths of both channel parts 8', 8" and consequently to an increase in the length of the effective channel length between the passage openings 5, 6 in FIG. 1 shown. The length of the channel can be set variably within a very broad range corresponding to the intended use at least in the course of the manufacture of the bush mount with a generally simple design of a hydraulically damping bush mount when a channel carrier 4 of such a design is used. The channel carrier 4, which, as was explained above, surrounds the elastomeric damping member 1 with the chambers 2, 3, may, of course, be surrounded in turn by a sleeve during the mounting of the mount to form a channel wall limiting the channel 8. Due to the channel geometry displaced to the outside, a possibility is offered for also making provisions for the possibility of setting for the finished component. It is thus conceivable that the sleeve surrounding the channel carrier 8, which was already mentioned, is firmly coupled with the sliding ring 7 and the sliding ring 7 is displaced in the groove by rotating the sleeve by means of actuators 10, 11 arranged thereon.

Figure 2:
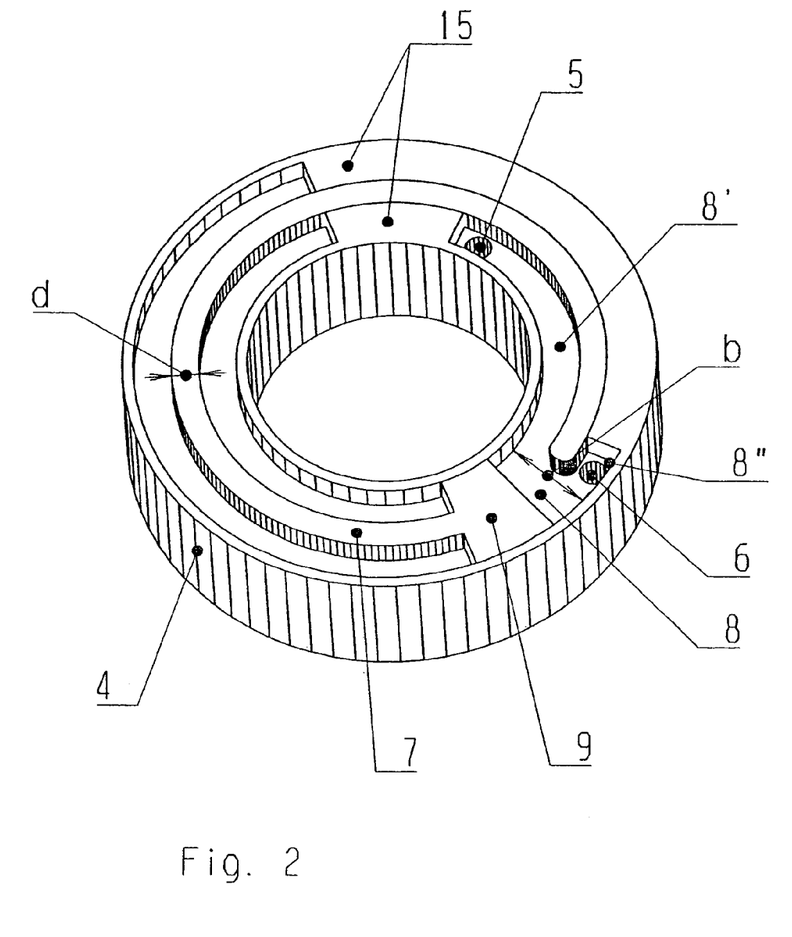
FIG. 2 is perspective view of another embodiment of the channel carrier with a sliding ring.

Aother embodiment for the channel carrier 4, which is preferably also intended for use in bush mounts, is shown in FIG. 2. The channel carrier 4 is designed here in the manner of a disk, whose height is comparatively small. More exactly, it is a perforated disk with a central hole and a ring thickness approximately corresponding to its height. To form the channel 8, the annular groove is recessed in this embodiment in the disk, which is to be placed on the axial end of a bush mount, from the front side, i.e., in the axial direction in relation to the geometry of the mount. Following the principle of the present invention, a sliding ring 7 is incorporated in the annular groove in this case as well, and is guided displaceably in same. The annular groove forming the channel 8 has narrowed parts 15 for guiding the sliding ring 7 in the area of the stationary passage openings 5, 6 to the chambers 2, 3 of the mount body, which is likewise not shown here. The passage openings 5, 6 extend axially after the mounting on the mount. These narrowed parts 15 limit at the same time the respective longitudinal extensions of the two channel parts 8', 8" formed by the sliding ring 7. The two channel parts 8', 8" unite, as in the embodiment according to FIG. 1, between the ends of the open sliding ring 7, one end of the sliding ring forming the channel deflection 9. The entire arrangement shown in FIG. 2 is covered by a cover (not shown) on the axial side, i.e., from the top in the figure. The cover may also be used at the same time to rotate the sliding ring 7 in the groove and to create in this way the possibility of keeping the channel length variable, e.g., for tuning measures, even on the ready-to-install mount.

Figure 3:
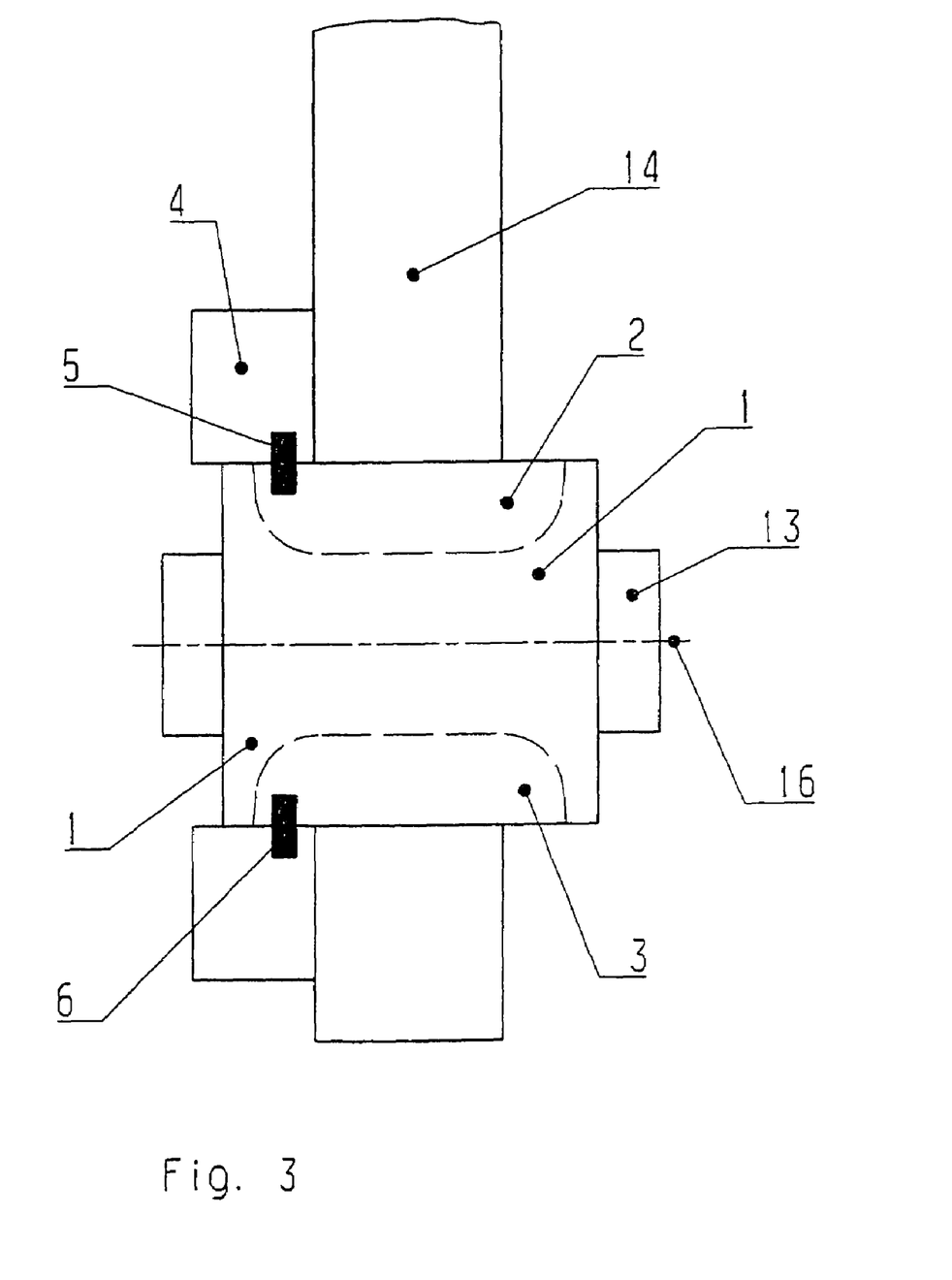
FIG. 3 is a view showing a bush mount mounted on a transversal swinging arm to absorb the forces.

FIG. 3 shows a bush mount according to the present invention, by means of which, e.g., the forces acting on the transversal swinging arm 14 of a motor vehicle are damped. The mount is mounted in a lug of the transversal swinging arm for this purpose. The mount comprises an inner part 13, an elastomeric mount body 1 (damping member), which surrounds the inner part and is connected thereto by vulcanization, with chambers 2, 3 arranged in it as well as the channel carrier 4, which has a design comparable to that in FIG. 1. The mount body is surrounded by the channel carrier 4 designed as a hollow cylinder at its axial end. Corresponding to the present invention, the channel 8, which is formed in the channel carrier 4 but is not visible here, has stationary passage openings 5, 6 (indicated symbolically in the figure) for connecting the chambers 2, 3. The channel length can be changed by means of the sliding ring 7, which is arranged in the channel 8 and is likewise not visible, according to the explanations given for FIG. 1.

Figure 4:
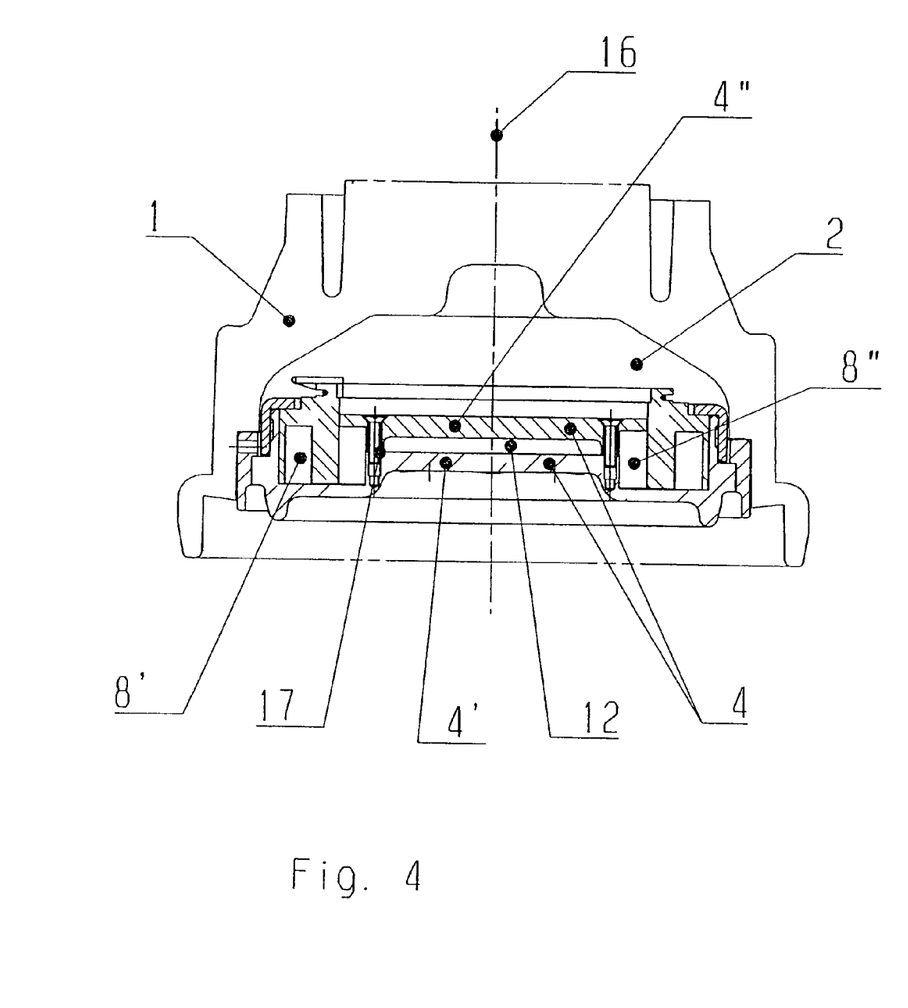
FIG. 4 is a sectional view of the upper part of an engine mount with the channel parts.

FIG. 4 shows the upper part of an engine mount. A chamber 2 for accommodating a damping agent is arranged in the elastomeric carrying body (damping member) 1 of this engine mount. The mount is closed in the downward direction by a bellows, which is not shown in the figure. The second chamber 3, not shown here, is formed between the bellows and the channel carrier 4. The two chambers 2, 3, arranged axially one after another, are consequently separated from each other in space by the channel carrier 4, but are connected to one another via the channel 8 in a flow-conducting manner for the circulation of the damping agent. Following the principle of the present invention, the channel 8 is divided into two channel parts 8', 8", through which the damping agent flows in opposite directions, in this case as well.

Figure 5:
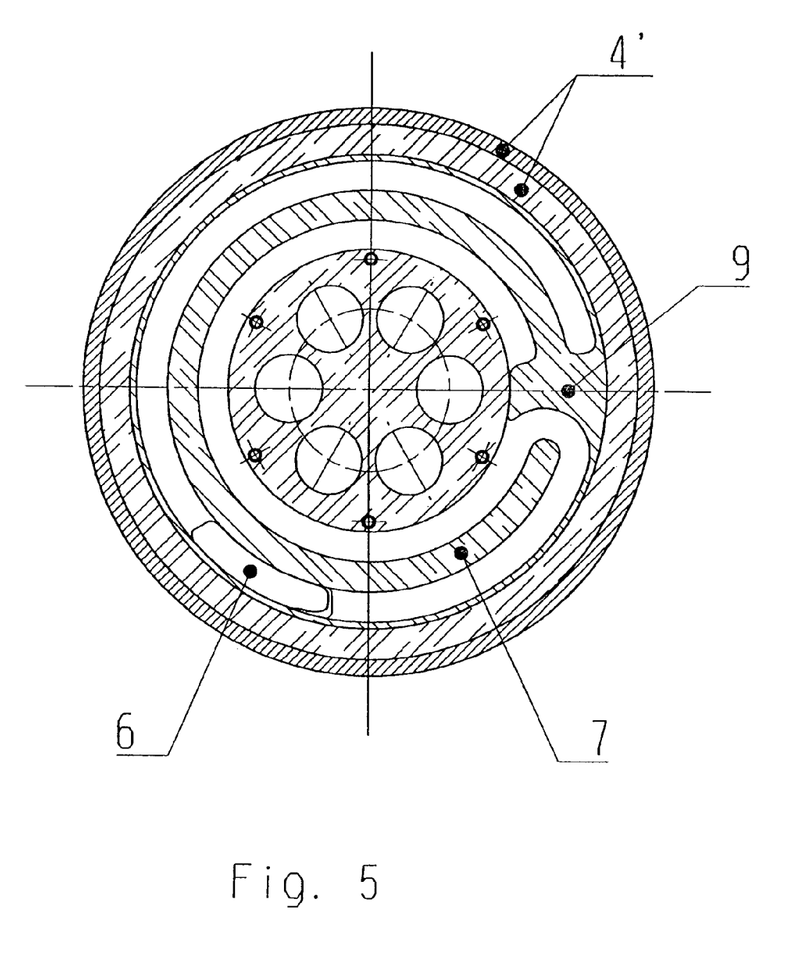
FIG. 5 is a sectional view of the multipart design of the channel carrier for the mount according to FIG. 4.
Figure 6:
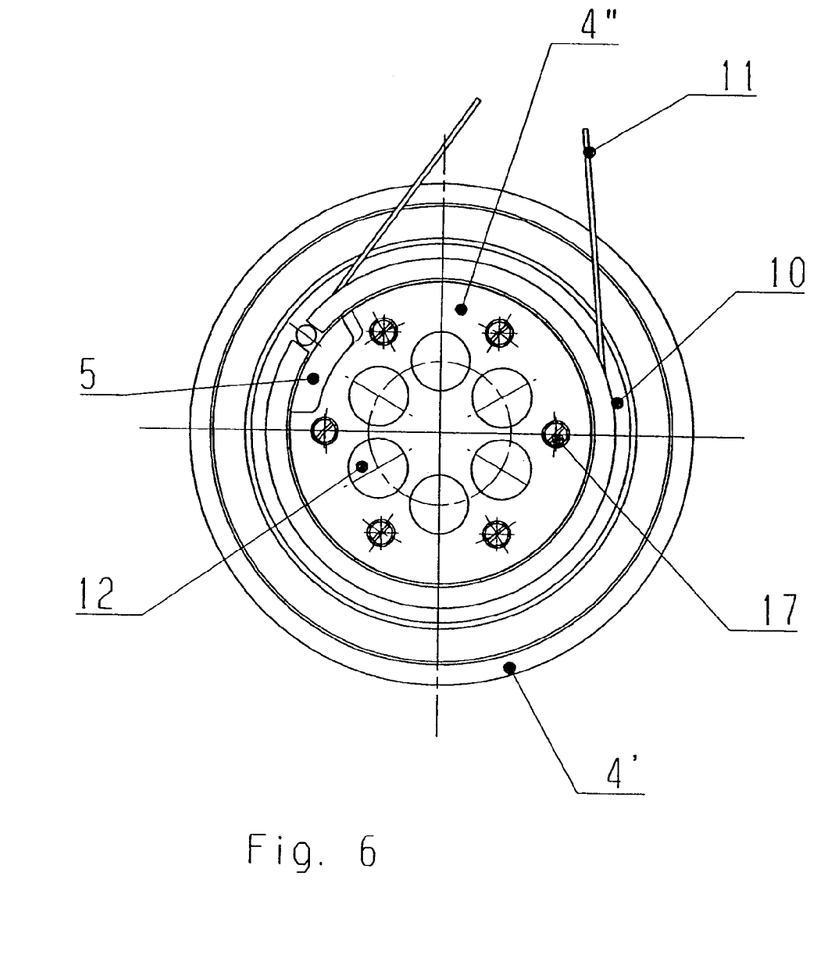
FIG. 6 is a view of the channel carrier according to FIG. 5 with actuators for adjusting the channel length.

The design of the channel carrier 4 is illustrated in FIGS. 5 and 6. The channel carrier 4 has a multipart design. It comprises a first disk-shaped element 4' with an annular groove recessed therein on the front side and another, second disk element 4", which is not shown in FIG. 5 (but see FIG. 6) and is to be connected to the first disk-shaped element 4' by means of screws 17.

FIG. 5 shows a sectional view of the channel carrier 4 as well as of the sliding ring 7 arranged in the annular groove with the channel deflection 9. In this embodiment, the sliding ring 7 is part of a more massive ring element, likewise shown in a sectional view here, with an (unrecognizable) annular groove opened into the plane of the view to form the sliding ring 7 proper. In the assembled state, the two disk-shaped elements 4', 4", designed as perforated disks, enclose between them a membrane 12. Each of the disk-shaped elements 4', 4" has a passage opening 5, 6 in a fixed position to the respective chamber 2, 3 adjoining same in the assembled mount. The perforated disks 4', 4" have one or, as in the example, a plurality of holes or (not obligatorily round) recesses. These recesses define the elasticity of the enclosed membrane 12 (rubber disk) acting as a buckling spring. The oscillating liquid can be manipulated on the basis of this elasticity. The necessary dynamic change in volume is achieved in cooperation with the damping member enclosing the upper chamber 2. However, the elasticity may also be determined not only by the membrane being used here, but also by other elements used instead, e.g., a rubber disk vulcanized into an outer ring of the mount or a mechanical spring. The specific design embodiment of the channel carrier is to be correspondingly adapted in this case while maintaining the principle of the present invention.

FIG. 6 shows the channel carrier 4 once again in the mounted state (its disk-shaped elements 4', 4" are connected to one another by screws 17). According to this view, the second disk-shaped element 4" is connected to the first one with the membrane 12 inserted between them. In the assembled state of a mount according to FIG. 4, the upper chamber 2 of the mount is adjacent to the disk element 4", while the lower compensating chamber 3, not shown in FIG. 4, is arranged adjacent to the disk element 4'. Via the passage opening 5, the chamber 2 is connected in a flow-conducting manner to the channel 8, whose length can be changed, as is seen in FIG. 5, by rotating the sliding ring 7. The channel length may be set either in the course of the manufacture of the mount or, in a design according to FIG. 6, even in the ready-to-install state of the mount. Actuators 10, 11 are provided in the latter case on the circumference of the disk-shaped element 4" adjoining the upper chamber 3 for the rotation of the channel carrier 4 and the sliding ring 7 in relation to one another. These actuators are formed by an annular groove 10 on the circumference of the element 4" and a cable 11 running therein. By pulling the cable 11 indicated in the figure, the disk-shaped element 4" as a part of the channel carrier 4 can be rotated in relation to the sliding ring 7 and the channel length can thus be varied. Depending on the particular application, the setting of the channel length may be performed manually or by means of a drive coupled with the cable 11. Other possible embodiments of the actuators (gear mechanism, belt drive, pneumatic system, hydraulic system, etc.) are, of course, also possible, and their coupling with the sliding ring and/or the channel carrier is facilitated by the principle of the present invention. In particular, additional measures for sealing the channel or the chambers are dispensable.

While specific embodiments of the invention have been shown and described in detail to illustrate the application of the principles of the invention, it will be understood that the invention may be embodied otherwise without departing from such principles.

The invention claimed is:

1. A hydraulically damping rubber mount with variable channel length, the mount comprising:
   an elastomeric spring element or damping member with a mount body with at least two chambers for accommodating a liquid damping agent;
   a channel carrier with a channel formed as an annular groove therein, said channel carrier connecting said chambers in a flow-conducting manner, said channel carrier having passage openings from said channel to said chambers; and
   a sliding ring segment guided displaceably in said channel, said sliding ring segment having a narrow portion at one end with a smaller thickness compared with a width of the annular groove and having an expanded portion at another end having a width substantially similar to a width of the annular groove, said narrow portion extending circumferentially in said annular groove and being spaced from said sides of said annular groove to define first and second channel parts on diametrically opposite sides of said narrow portion, said first and second channel parts uniting between said ends of said ring segment.

2. A hydraulically damping rubber mount with variable channel length, the mount comprising:
   an elastomeric spring element or damping member with a mount body with at least two chambers ford in the mount body for accommodating a fluid damping agent;
   a channel carrier that is axially symmetrical to said mount axis with a channel formed as an annular groove therein connecting said chambers in a flow-conducting manner for the circulation of the damping agent, wherein said channel has passage openings in fixed positions to said chambers and is formed by an annular groove, which extends circumferentially in said channel carrier or on the outer circumference of said channel carrier; and
   a sliding ring segment, said sliding ring segment having a narrow portion at one end with a thickness which is smaller than a width of said annular groove and having an expanded portion at another end having a width substantially similar to a width of the annular groove, forming a channel deflection, so that said channel is divided by said sliding ring into two said channel parts which unite between said one end and said another end and through which the damping agent flows in opposite directions.

3. A hydraulically damping rubber mount in accordance with claim 2, wherein a longitudinal extension of said channel is limited in an area of said passage openings by said narrowed parts of the annular groove forming said channel, and said sliding ring is guided by said narrowed parts in the annular groove.

4. A hydraulically damping rubber mount in accordance with claim 2, wherein said channel carrier is a hollow cylinder, and said annular groove forming said channel is recessed in the jacket surface of this hollow cylinder, said jacket surface being surrounded by a sleeve.

5. A hydraulically damping rubber mount in accordance with claim 2, wherein said channel carrier is disk-shaped and said channel is designed as an annular groove, which is recessed axially in said channel carrier relative to a geometry of the mount and is covered by a cover.

6. A hydraulically damping rubber mount in accordance with claim 4, wherein the mount is a bush mount with an essentially cylindrical inner part, an elastomeric damping member surrounding said inner part and connected thereto by vulcanization, as well as two cambers formed radially opposite each other in said elastomeric damping member.

7. A hydraulically damping rubber mount in accordance with claim 6, wherein said elastomeric damping member is surrounded by said channel carrier with the sleeve surrounding said channel carrier completely or over a section of an axial extension of said channel carrier, wherein said passage openings extend radially between said channel and said chambers.

8. A hydraulically damping rubber mount in accordance with claim 6, wherein said channel carrier with the cover is arranged axially on the front side of said elastomeric damping member, wherein said passage openings extend axially between said channel and said chambers.

9. A hydraulically damping rubber mount in accordance with claim 1, wherein said channel carrier is a hollow cylinder, and said annular groove forming said channel is recessed in the jacket surface of this hollow cylinder, said jacket surface being surrounded by a sleeve.

10. A hydraulically damping rubber mount in accordance with claim 9, wherein the mount is a bush mount with an essentially cylindrical inner part, an elastomeric damping member surrounding said inner part and connected thereto by vulcanization, as well as two chambers formed radially opposite each other in said elastomeric damping member.

11. A hydraulically damping rubber mount in accordance with claim 10, wherein said elastomeric damping member is surrounded by said channel carrier with the sleeve surrounding said channel carrier completely or over a section of an axial extension of said channel carrier, wherein said passage openings extend radially between.

12. A hydraulically damping rubber mount in accordance with claim 10, wherein said channel carrier with the cover is arranged axially on the front side of said elastomeric damping member, wherein said passage openings extend axially between the said channel and said chambers.

13. A hydraulically damping rubber mount in accordance with claim 1, wherein said channel carrier is disk-shaped and said channel is designed as an annular groove, which is recessed axially in said channel carrier relative to a geometry of the mount and is covered by a cover.

14. A hydraulically damping rubber mount in accordance with claim 1, wherein actuators can be actuated from the outside of the mount and by means of which said channel carrier and said sliding ring can be rotated in relation to one another, so that the channel length resulting from the sum of the extensions of said two channel parts can be set variably even on the mount installed corresponding to its intended use, are arranged at said channel carrier at said sliding ring.

15. A hydraulically damping rubber mount in accordance with claim 1, wherein:
   said channel carrier and said sliding ring are arranged between said chambers.

16. A hydraulically damping rubber mount in accordance with claim 1, wherein:
   said chambers are arranged axially one after another;
   said channel carrier is disk-shaped channel carrier and is arranged between said chambers.

17. A hydraulically damping rubber mount in accordance with claim 1, wherein:
   said channel carrier and said sliding ring are arranged substantially concentrically with said chambers.

18. A hydraulically damping rubber mount in accordance with claim 1, wherein:

said channel carrier and said sliding ring are arranged substantially concentrically with said damping member.

19. A hydraulically damping rubber mount in accordance with claim 1, wherein:
said channel carrier and said sliding ring are arranged in said damping member.

20. A hydraulically damping rubber mount with variable channel length, the mount comprising:
an elastomeric spring element or damping member with a mount body with at least two chambers for accommodating a liquid damping agent;
a channel carrier with a channel formed as an annular groove therein, said channel carrier connecting said chambers in a flow-conducting manner, said channel carrier having passage openings from said channel to said chambers;
a sliding ring segment arranged in said channel, said sliding ring having a narrow portion at one end with a width that is smaller than said width of said channel, said sliding ring having an expanded portion at another end with a width substantially similar to said width of said channel, said narrow portion extending circumferentially in said channel and being spaced from said sides of said channel to define first and second channel parts on diametrically opposite sides of said narrow portion, said first and second channel parts uniting between said ends of said ring segment, said ring segment being movably arranged in said channel, a longitudinal extension of said channel being limited in an area of said passage openings by narrowed parts of the annular groove forming said channel, and said sliding ring being guided by said narrowed parts in the annular groove.

21. A hydraulically damping rubber mount with variable channel length, the mount comprising:
an elastomeric spring element or damping member with a mount body with at least two chambers for accommodating a liquid damping agent;
a channel carrier with a channel formed as an annular groove therein, said channel carrier connecting said chambers in a flow-conducting manner, said channel carrier having passage openings from said channel to said chambers;
a sliding ring segment arranged in said channel, said sliding ring segment having a narrow portion at one end with a width that is smaller than said width of said channel, said sliding ring having an expanded portion at another end with a width substantially similar to said width of said channel, said narrow portion extending circumferentially in said channel and being spaced from said sides of said channel to define first and second channel parts on diametrically opposite sides of said narrow portion, said first and second channel parts uniting been said ends of said ring segment, said ring segment being movably arranged in said channel, said channel carrier being disk-shaped and said channel being designed as an annular groove, which is recessed axially in said channel carrier relative to a geometry of the mount and is covered by a cover, said mount being an engine mount with two said chambers arranged axially one after another, said chambers being separated from each other in space by said channel carrier arranged in the mount body at right angles to said mount axis, wherein said channel carrier has a multi-part design and comprises two perforated disks enclosing a membrane between them, and wherein said sliding ring is arranged in said channel and has a circumferential annular groove, with an opening facing the annular groove recessed in one of said perforated disks to form said channel.

22. A hydraulically damping rubber mount with variable channel length, the mount comprising:
an elastomeric spring element or damping member with a mount body with at least two chambers for accommodating a liquid damping agent;
a channel carrier with a channel formed as an annular groove therein, said channel carrier connecting said chambers in a flow-conducting manner, said channel carrier having passage openings from said channel to said chambers;
a sliding ring segment arranged in said channel, said slid ring segment having a narrow portion at one end with a width that is smaller than said width of said channel, said sliding ring having an expanded portion at another end with a width substantially similar to said width of said channel, said narrow portion extending circumferentially in said channel and being spaced from said sides of said channel to define first and second channel parts on diametrically opposite sides of said narrow portion, said first and second channel parts uniting between said ends of said ring segment;
actuators which can be actuated from the outside of the mount and by means of which said channel carrier and said sliding ring can be rotated in relation to one another, so that the channel length resulting from the sum of the extensions of said two channel parts can be set variably even on the mount installed corresponding to its intended use, are arranged at said channel carrier at said sliding ring;
a cable wherein an additional annular groove, in which said cable runs, by means of which said cable said channel carrier and said sliding ring can be rotated in relation to one another, is recessed on the circumference of said channel carrier for the variable setting of the channel length.

23. A hydraulically damping rubber mount with variable channel length, the mount comprising:
an elastomeric spring element or damping member with a mount body with at least two chambers formed in the mount body for accommodating a fluid damping agent;
a channel carrier that is axially symmetrical to said mount axis with a channel formed as an annular groove therein connecting said chambers in a flow-conducting manner for the circulation of the damping agent, wherein said channel has passage openings in fixed positions to said chambers and is formed by an annular groove, which extends circumferentially in said channel carrier or on the outer circumference of said channel carrier;
a sliding ring segment arranged in said channel, said sliding ring segment having a narrow portion at one end with a width that is smaller than said width of said channel, said sliding ring having an expanded portion at another end with a width substantially similar to said width of said channel, said narrow portion extending circumferentially in said channel and being spaced from said sides of said channel to define first and second channel parts on diametrically opposite sides of said narrow portion, said first and second channel parts uniting between said ends of said ring segment, said channel carrier being disk-shaped and said channel being designed as an annular groove, which is recessed axially in said channel carrier relative to a geometry of the mount and is covered by a cover, the mount being an engine mount with two said chambers arranged axially one after another, said chambers being separated from each other in space by said cannel carrier arranged in the mount body at right angles to said mount axis, wherein said channel carrier has a multi-part design and comprises two perforated disks enclosing a membrane between them, and wherein said sliding ring is arranged in said channel and has a circumferential annular groove, with an opening facing the annular groove recessed in one of said perforated disks to form said channel.

24. A hydraulically damping rubber mount with variable channel length, the mount comprising:
   an elastomeric spring element or damping member with a mount body with at least two chambers formed in the mount body for accommodating a fluid damping agent;
   a channel carrier that is axially symmetrical to said mount axis with a channel formed as an annular groove therein connecting said chambers in a flow-conducting manner for the circulation of the damping agent, wherein said channel has passage openings in fixed positions to said chambers and is formed by an annular groove, which extends circumferentially in said channel carrier or on the outer circumference of said channel carrier;
   a sliding segment in said channel, said sliding ring segment having a narrow portion at one end with a width that is smaller than said width of said channel, said sliding ring having an expanded portion at another end with a width substantially similar to said width of said channel, said narrow portion extending circumferentially in said channel and being spaced from said sides of said channel to define first and second channel parts on diametrically opposite sides of said narrow portion, said first and second channel parts uniting between said ends of said ring segment;
   a cable actuator for rotating said channel carrier and said sliding ring in relation to one another, so that the channel length resulting from the sum of the extensions of said two channel parts can be set variably even on the mount installed corresponding to its intended use, are arranged at said channel carrier and/or at said sliding ring, said channel carrier having an additional annular groove, in which said cable runs, recessed on the circumference of said channel carrier for the variable setting of the channel length.

25. A hydraulically damping rubber mount comprising:
   a mount body defining first and second chambers;
   a channel carrier defining first and second flow passages in communication with respective said chambers, said channel carrier also defining an annular channel in communication with said first and second flow passages, said channel having a width and sides;
   a sliding ring segment arranged in said channel, said sliding ring having a narrow portion at one end with a width that is smaller than said width of said channel, said sliding ring having an expanded portion at another end with a width substantially similar to said width of said channel, said narrow portion extending circumferentially in said channel and by spaced from said sides of said channel to define first and second channel parts on diametrically opposite sides of said narrow portion, said first and second channel parts uniting between said ends of said ring segment, said ring segment being movably arranged in said channel to have movement of said ring segment in said channel change a length of both said first and second channel parts.

26. A hydraulically damping rubber mount in accordance with claim 25, wherein:
   said flow passages and said ring segment are arranged to have a flow between said chambers flow in opposite directions in said first and second channel parts;
   movement of said ring segment in said channel changes said length of said channel parts by substantially an equal amount.

\* \* \* \* \*